US012275021B2

(12) United States Patent
Pitkämäki et al.

(10) Patent No.: US 12,275,021 B2
(45) Date of Patent: Apr. 15, 2025

(54) CENTRIFUGAL SEPARATOR HAVING A SCREW CONNECTION BETWEEN UPPER AND LOWER BOWLS

(71) Applicant: Alfa Laval Corporate AB, Lund (SE)

(72) Inventors: Jouko Pitkämäki, Eskilstuna (SE); Stefan Svensson, Vaxholm (SE)

(73) Assignee: ALFA LAVAL CORPORATE AB, Lund (SE)

( * ) Notice: Subject to any disclaimer, the term of this patent is extended or adjusted under 35 U.S.C. 154(b) by 934 days.

(21) Appl. No.: 17/419,342

(22) PCT Filed: Dec. 18, 2019

(86) PCT No.: PCT/EP2019/086053
§ 371 (c)(1),
(2) Date: Jun. 29, 2021

(87) PCT Pub. No.: WO2020/156739
PCT Pub. Date: Aug. 6, 2020

(65) Prior Publication Data

US 2022/0072565 A1 Mar. 10, 2022

(30) Foreign Application Priority Data

Jan. 28, 2019 (EP) .................................... 19153987

(51) Int. Cl.
*B04B 7/14* (2006.01)
*B04B 1/08* (2006.01)

(52) U.S. Cl.
CPC . *B04B 7/14* (2013.01); *B04B 1/08* (2013.01)

(58) Field of Classification Search
CPC ................ B04B 7/14; B04B 1/08; B04B 7/08
See application file for complete search history.

(56) References Cited

U.S. PATENT DOCUMENTS 565,278 A 8/1896 Kimball
565,279 A 8/1896 Kimball
(Continued)

FOREIGN PATENT DOCUMENTS

CN 87 1 04299 A 12/1987
CN 1179736 A 4/1998
(Continued)

OTHER PUBLICATIONS

English translation of Chinese Ofice Action and Search Report for Chinese Application No. 2019800904632, dated Apr. 25, 2023.
(Continued)

*Primary Examiner* — Walter D. Griffin
*Assistant Examiner* — Shuyi S. Liu
(74) *Attorney, Agent, or Firm* — Birch, Stewart, Kolasch & Birch, LLP

(57) ABSTRACT

A centrifugal separator bowl, having a vertical rotational axis, the separator bowl defining a separation space, and including an upper bowl section having a first threading, the first threading having a first inner diameter and a first outer diameter and defining an upper surface, and a lower bowl section having a second threading corresponding to the first threading of the upper bowl section, the second threading having a second outer diameter and a second inner diameter and defining a lower surface. The upper surface of the first threading of the upper bowl section and the lower surface of the second threading of the lower bowl section form a screw connection. The upper surface of the first threading is inclined upward with a first angle from the first inner diameter to the first outer diameter and the lower surface of the second threading is inclined downward with a second angle from the second outer diameter to the second inner diameter relative to a horizontal plane extending perpendicular to the vertical rotation axis.

19 Claims, 2 Drawing Sheets

(56) References Cited

U.S. PATENT DOCUMENTS

| | | | |
|---|---|---|---|
| 575,727 | A | 1/1897 | Ohlsson |
| 663,112 | A | 12/1900 | Berrigan |
| 774,821 | A | 11/1904 | Berrigan |
| 1,202,397 | A | 10/1916 | Lloyd |
| 2,765,978 | A | 10/1956 | Strezynski |
| 3,073,517 | A | 1/1963 | Pickels et al. |
| 5,000,730 | A | 3/1991 | Back |
| 6,971,685 | B2 | 12/2005 | Hashem |
| 7,749,148 | B2 | 7/2010 | Mackel et al. |
| 2002/0138076 | A1 | 9/2002 | Biedermann et al. |
| 2006/0173461 | A1 * | 8/2006 | Kay .................. A61B 17/8625 606/318 |
| 2009/0050732 | A1 | 2/2009 | Ishikawa |
| 2009/0054223 | A1 * | 2/2009 | Mackel ..................... B04B 1/10 494/27 |
| 2010/0052319 | A1 | 3/2010 | Benzie et al. |
| 2017/0203306 | A1 | 7/2017 | Penkl et al. |
| 2018/0216655 | A1 | 8/2018 | Blanc et al. |

FOREIGN PATENT DOCUMENTS

| | | | | |
|---|---|---|---|---|
| CN | 203271652 | U | 11/2013 | |
| CN | 106413906 | A | 2/2017 | |
| CN | 107771103 | A | 3/2018 | |
| DE | 223 080 | A1 | 6/1985 | |
| DE | 35 11 422 | A1 | 1/1986 | |
| EP | 0 346 056 | A2 | 12/1989 | |
| EP | 0309478 | B1 * | 4/1992 | ............... B04B 7/08 |
| GB | 320300 | | 10/1929 | |
| JP | 1-307465 | A | 12/1989 | |
| JP | 2092-330976 | A | 11/2002 | |
| JP | 2002330976 | A * | 11/2002 | ......... A61B 17/7032 |
| JP | 2008-529768 | A | 8/2008 | |
| JP | 2009-54223 | A | 3/2009 | |
| JP | 2009-108958 | A | 5/2009 | |
| KR | 10-2015-0081341 | A | 7/2015 | |
| WO | WO 96/22835 | A1 | 8/1996 | |
| WO | WO 2014/072417 | A1 | 5/2014 | |
| WO | WO 2016/170090 | A1 | 10/2016 | |

OTHER PUBLICATIONS

English translation of Chinese Office Action and Search Report for Chinese Application No. 2019800904632, dated Aug. 15, 2022.

English translation of the Japanese Office Action for corresponding Japanese Application No. 2021-542485, dated Aug. 8, 2022.

International Search Report, issued in PCT/EP2019/086053, dated Feb. 25, 2020.

Written Opinion of the International Searching Authority, issued in PCT/EP2019/086053, dated Feb. 25, 2020.

English Translation of Korean Office Action for Korean Application No. 10-2021-7027028, dated Jan. 25, 2023.

English translation of the Korean Office Action for Korean Application No. 10-2021-7027028, dated May 15, 2024.

* cited by examiner

CENTRIFUGAL SEPARATOR HAVING A SCREW CONNECTION BETWEEN UPPER AND LOWER BOWLS

AREA OF INVENTION

The present invention relates to a centrifugal separator bowl and a centrifugal separator comprising such a separator bowl, having a vertical rotational axis, the separator bowl defining a separation space, and comprising an upper bowl section and a lower bowl section.

BACKGROUND OF INVENTION

Conventionally, in separators having a vertical rotational axis, the product to be separated is supplied to a separation space in a rotating separator bowl through an inlet pipe and radial distribution pipes. In the separation space the product enters a disc stack comprised of frusto-conical separator discs, stacked on each other and spaced from each other. Heavier solids settle on the bottom side of the separator discs and are transported radially towards the outer periphery of the disc stack due to centrifugal forces and further out towards the interior wall of the separator bowl, while the liquid flows inwardly. The solids may be removed via nozzles or via discharge openings typically arranged in the circumference of the separator bowl.

The separator bowl having a vertical rotational axis generally comprises a lower bowl section also called bowl body and an upper bowl section also called bowl hood, which are releasably fastened to one another. Previously known solutions comprise fastening the bowl body and the bowl hood to one another by a screw connection and a separate locking ring, e.g. see DE 35 11 422. A direct screw connection between the bowl body and the bowl hood has previously suggested by e.g. EP 0309 478 B1 and U.S. Pat. No. 7,749,148 B2.

For many bowl types it is common that the upper part of the bowl body and the lower part of the bowl hood are connected and thus are governing when determining the maximum bowl speed. This area is submitted to both radial and axial forces, which lead to stress in the material of both the lower part of the bowl hood and the upper part of the bowl body. The stress may lead to radial deformation and in extreme cases breakage. Axial forces arise from the internal bowl pressure and in the case of a separate locking ring, this transmit those forces between the bowl body and the bowl hood. However, a construction with a locking ring is complicated and cumbersome to mount and dismount.

DISCLOSURE OF INVENTION

The object of the present invention is to provide a simple connection between the bowl hood and the bowl body of a separator bowl of a centrifugal separator that is rigid and which at the same time distributes axial and radial forces to minimize the radial deformation.

The upper bowl section has a first threading with a first inner diameter and a first outer diameter and the lower bowl section has a corresponding second threading with a second outer diameter and a second inner diameter. A screw connection is formed by an upper surface of said first threading of the upper bowl section and a lower surface of said second threading of the lower bowl section.

Said upper surface of said first threading is inclined upward with a first angle (α) from said first inner diameter to said first outer diameter and said lower surface of said second threading is inclined downward with a second angle (β) from said second outer diameter to said second inner diameter relative to a horizontal plane extending perpendicular to said vertical rotation axis.

The benefits of this is that the bowl hood and the bowl body may be efficiently locked to each other and an advantageous distribution of axial and radial forces, may be enabled.

The first angle (α) and said second angle (β) may be the same.

The upper bowl section may be screwed into the lower bowl section.

In another embodiment the lower bowl section may be screwed into the upper bowl section.

Said angles (α, β) may be between 1° and 45°, preferably between 5° and 30°, and more preferably between 10° and 20°.

Said separator bowl may have an inlet for feeding a fluid mixture to be separated into components into said separation space.

Said separator bowl may have at least one outlet for discharge of a separated component of said fluid mixture from said separation space.

A stack of frusto-conical separator discs may be arranged in said separation space.

The upper bowl section may have a wall portion with a larger diameter arranged above said lower wall portion and with a surface facing downwards which is adapted to be in contact with a surface on said upper wall portion of said lower bowl section, thus forming a stop for said screw connection.

Further aspects of the invention are apparent from the dependent claims and the description.

BRIEF DESCRIPTION OF THE DRAWINGS

Further objects, features and advantages will appear from the appended claims and the following detailed description of several embodiments of the invention with reference to the drawings, in which:

DETAILED DESCRIPTION OF EMBODIMENTS

Figure 1:
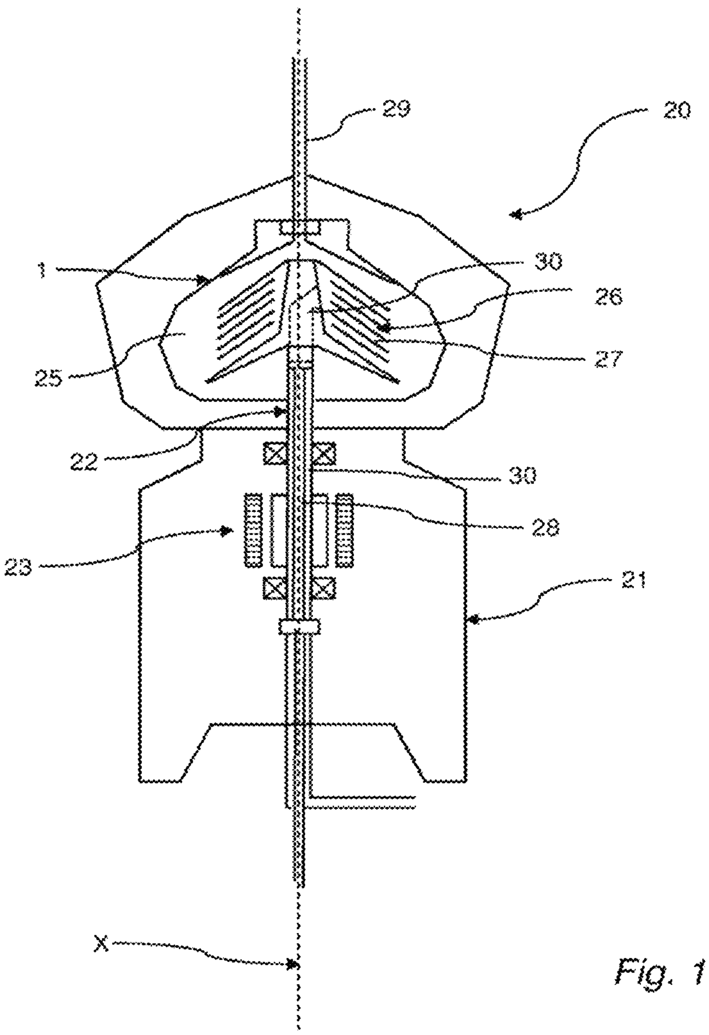
FIG. 1 is a schematic view of a cross section of an embodiment of a centrifugal separator according to the invention.

FIG. 1 shows a schematic view of a cross-section of an embodiment of a centrifugal separator 20. The separator comprises a stationary frame 21, a spindle 22, which is rotatably supported in said frame 21 e.g. via two bearings, and a centrifugal separator bowl 1 rotatably arranged in said frame 21 adjoined to the axially upper end of said spindle 22 to rotate together with the spindle 22 around a vertical axis of rotation (X). The frame 21 may comprise more than one individual part, i.e. it may be assembled from several parts. A drive arrangement 23 is configured to rotate the spindle 22 with the centrifugal separator bowl 1. In these embodiments, the drive arrangement 23 forms part of the spindle, thus driving the centrifugal separator bowl 1 directly. The drive arrangement 23 comprises an electric motor and a rotor if the electric motor forms part of the spindle 22. In alternative embodiments, the drive arrangement may instead be connected to the spindle via a transmission, such that a first pulley is arranged on the electric motor, a second pulley is arranged on the spindle, and a belt extending between the first and second pullies. Alternatively, the transmission may be a gear transmission comprising cog wheels, or any other suitable transmission for transferring torque from the electric motor to the spindle.

Figure 2:
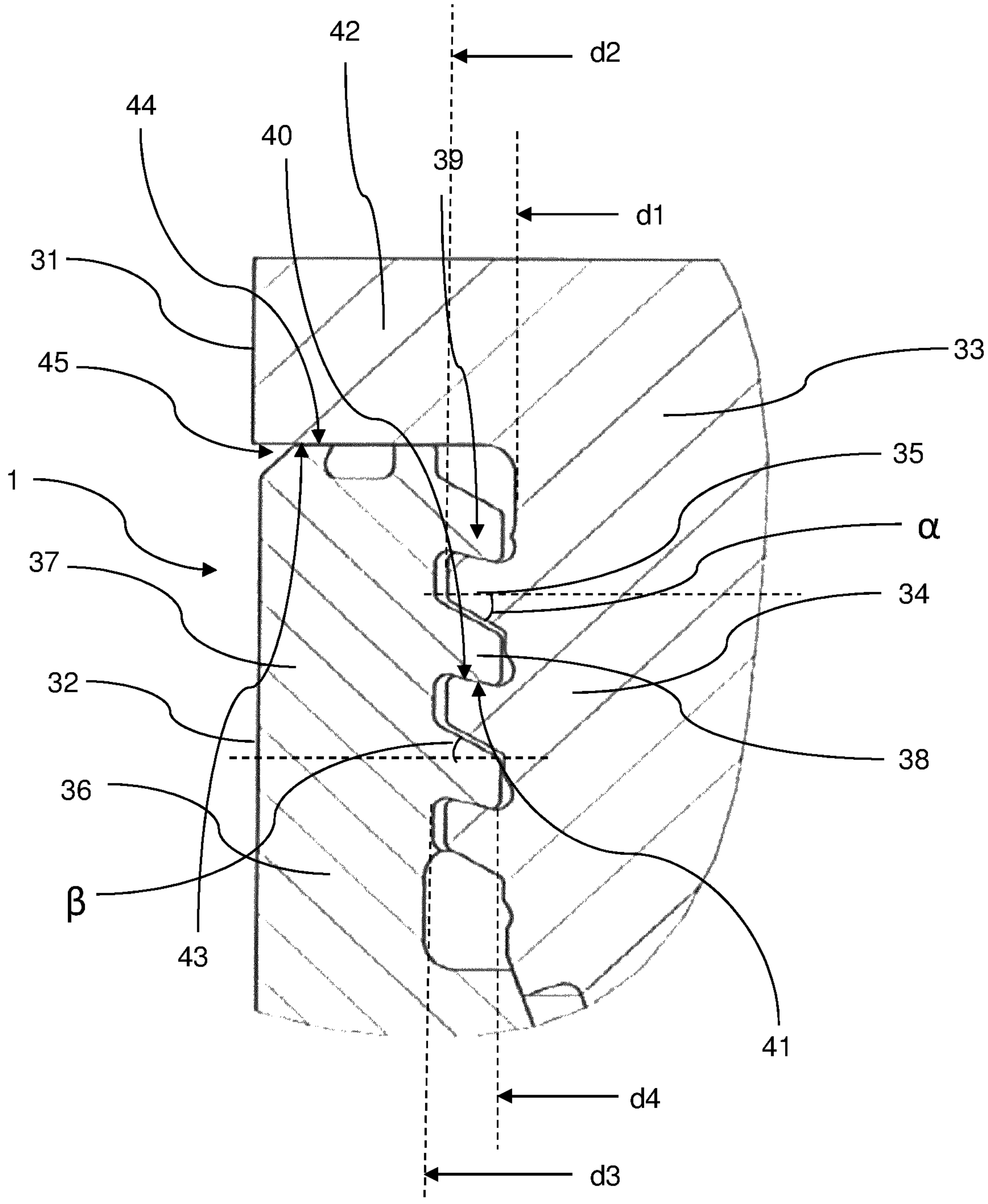
FIG. 2 is a view of a cross-section of the connection area between the upper bowl section and the lower section according to an embodiment of the invention.

The centrifugal separator bowl 1 encloses a separation space 25 in which a stack 26 of separation discs 27 is arranged in order to achieve effective separation of a fluid that is processed and separated into components. The separation discs 27 of the stack 26 have a frustoconical shape and are examples of surface-enlarging inserts. The stack 26 is fitted centrally and coaxially with the centrifugal separator bowl 1. In FIG. 2, only a few separation discs 27 are shown. The stack 26 may for example contain above 100 separation discs, such as above 200 separation discs.

The centrifugal separator 20 may be configured for separating the liquid feed mixture into at least one light phase and a heavy phase. The liquid feed mixture may comprise e.g. one liquid, or two liquids. The liquid feed mixture may comprise solid matter, which may be separated from the liquid feed mixture as part of the heavy phase.

The centrifugal separator 20 comprises an inlet 28 for the liquid feed mixture, at least one first outlet 29 for the heavy phase, and a second outlet 30 for the light phase. In the illustrated embodiment, the liquid feed mixture to be separated is fed from the bottom of the centrifugal separator 20 via the inlet 28 centrally into the centrifugal separator bowl 1, from which it is distributed to the separation space 25. During use of the centrifugal separator 20, the liquid feed mixture is separated into at least the heavy phase and the light phase in the separation space 25. The light phase flows towards the center of the separation space 25 and the heavy phase flows towards a radially outer periphery of the separation space 25. The separated light phase is lead from a central portion of the separation space 25 downwardly to the second outlet 30. That is, the second outlet 30 is arranged in fluid communication with the central portion of the separation space 25.

From a central portion of the centrifugal separator 1, the heavy phase is lead upwardly to the first outlet 29. The present invention is not limited to any particular types of liquid feed mixtures or separated fluid phases. Neither is the present invention limited to any particular inlet arrangement for the liquid feed mixture, nor to any particular second outlet 30 for the separated light phase.

In FIG. 2 Is illustrated a cross-section of an area of the centrifugal separator bowl 1 according to an embodiment disclosing a connection area between an upper bowl section 31, also named bowl hood, and a lower bowl section 32, also named bowl body. The upper bowl section 31 comprises a first wall 33 which has a lower wall portion 34. The lower wall portion 34 has an exterior first threading 35. The lower bowl section 32 comprises a second wall 36 which has an upper wall portion 37. The upper wall portion 37 has an interior second threading 38 corresponding to said exterior first threading 35. When the upper bowl section 31 and the lower bowl section 32 are mounted to form said centrifugal separator bowl 1 said first threading 35 and said second threading 38 are forming a screw connection 39 between them. Thus the upper wall portion 37 of the lower bowl section 32 is arranged outside of the lower wall portion 34 of the upper bowl section 31, in such a manner that the upper bowl section 31 being screwed into the lower bowl section 32.

Said screw connection 39 is formed by an upper surface 40 of said first threading 35 being in frictional contact with a lower surface 41 of said second threading 38. Said upper surface 40 of said first threading 35 is inclined upward with a first angle $\alpha$ from an inner diameter d1 of said first threading 35 to an outer diameter d2 of said first threading 35. Said inner diameter d1 is measured at the root of said first threading 35 and said outer diameter d2 is measured at the tip of said first threading 35. Said lower surface 41 of said second threading 38 is inclined downward with a second angle $\beta$ from an outer diameter d3 of said second threading 38 to an inner diameter d4 of said second threading 38. Said outer diameter d3 is measured at the root of said second threading 38 and said inner diameter d4 is measured at the tip of said second threading 38. In embodiments said first angle $\alpha$ and said second angle $\beta$ are the same. Said first and second angles $\alpha$, $\beta$ may be between 1° and 45°. In some embodiments said first and second angles $\alpha$, $\beta$ may be between 5° and 30°. In some embodiments said first and second angles $\alpha$, $\beta$ may be between 10° and 20°.

Above said lower wall portion 34 of the upper bowl section 31 there is a wall portion 42 with a larger diameter thus protruding radially outwards disclosing a flat surface 43 extending in a radial direction and facing downwards. The flat surface 43 is adapted to be in contact with a top surface 44 of projections on said upper wall portion 37 of said lower bowl section 32 facing upwards. When during mounting centrifugal separator bowl 1 by screwing together the upper and lower bowl sections 31, 32, the surfaces 43, 44 get in contact with each other they form a stop 45 of the screwing operation, and due to the frictional forces between the two surfaces 43, 44 thus also form an effective locking of said screw connection 39.

It is to be understood that the invention is not limited to the various example embodiments described above and shown in the drawings, but a person skilled in the art will realize that the example embodiments may be supplemented and modified in any manner within the scope of the invention as defined by the enclosed claims.

The invention claimed is:

1. A centrifugal separator bowl, having a vertical rotational axis, the separator bowl defining a separation space, and comprising:

an upper bowl section having a first threading on a lower wall portion, said first cylindrical threading having a first inner diameter and a first outer diameter and defining an upper surface, an upper wall portion extending radially from the lower wall portion; and a lower bowl section having a second cylindrical threading on an upper wall portion corresponding to the first threading of the upper bowl section, said second threading having a second outer diameter and a second inner diameter and defining a lower surface, wherein said upper surface of said first threading of the upper bowl section and said lower surface of said second threading of the lower bowl section form a screw connection, and wherein said upper surface of said first threading is inclined upward with a first angle from said inner diameter to said outer diameter and said lower surface of said second threading is inclined downward with a second angle from said outer diameter to said inner diameter relative to a horizontal plane extending perpendicular to said vertical rotation axis, wherein a lower surface of the upper wall portion is flat in a radial direction and forms a seal with a top surface of at least one projection extending from an upper surface of the upper wall portion of the lower bowl section.

2. The centrifugal separator bowl according to claim 1, wherein said first angle and said second angle are the same.

3. The centrifugal separator bowl according to claim 1, wherein the upper bowl section is screwed into the lower bowl section.

4. The centrifugal separator bowl according to claim 1, wherein the lower bowl section is screwed into the upper bowl section.

5. The centrifugal separator bowl according to claim 1, wherein said angles are between 1° and 45°.

6. The centrifugal separator bowl according to claim 1, wherein said angles are between 5° and 30°.

7. The centrifugal separator bowl according to claim 1, wherein said angles are between 10° and 20°.

8. The centrifugal separator bowl according to claim 1, wherein said separator bowl has an inlet for feeding a fluid mixture to be separated into components into said separation space.

9. The centrifugal separator bowl according to claim 8, wherein said separator bowl has at least one outlet for discharge of a separated component of said fluid mixture from said separation space.

10. The centrifugal separator bowl according to claim 1, wherein a stack of frusto-conical separator discs is arranged in said separation space.

11. A centrifugal separator comprising the centrifugal separator bowl according to claim 1.

12. The centrifugal separator bowl according to claim 2, wherein the upper bowl section is screwed into the lower bowl section.

13. The centrifugal separator bowl according to claim 2, wherein the lower bowl section is screwed into the upper bowl section.

14. The centrifugal separator bowl according to claim 2, wherein said angles are between 1° and 45°.

15. The centrifugal separator bowl according to claim 3, wherein said angles are between 1° and 45°.

16. The centrifugal separator bowl according to claim 4, wherein said angles are between 1° and 45°.

17. The centrifugal separator bowl according to claim 2, wherein said angles are between 5° and 30°.

18. The centrifugal separator bowl according to claim 3, wherein said angles are between 5° and 30°.

19. The centrifugal separator bowl according to claim 4, wherein said angles are between 5° and 30°.

* * * * *